United States Patent [19]

Dessaint et al.

[11] 4,295,976
[45] Oct. 20, 1981

[54] FLUORINATED ANTI-STAIN AND SOIL RELEASE FINISHES

[75] Inventors: André L. Dessaint, Nogent sur Oise Creil; Jean Perronin, Chantilly, both of France

[73] Assignee: Produits Chimiques Ugine Kuhlmann, Courbevoie, France

[21] Appl. No.: 727,497

[22] Filed: Sep. 28, 1976

[30] Foreign Application Priority Data

Oct. 17, 1975 [FR] France .................. 75 31794

[51] Int. Cl.³ .............. C14C 9/00; C07C 149/20; C07C 149/40; C09K 15/10
[52] U.S. Cl. .................. 252/8.9; 252/8.57; 252/395; 252/406; 560/15; 560/17; 560/154
[58] Field of Search ............ 260/481 R; 427/385 A, 427/385 B, 385 C, 388 R, 389, 390 E; 560/152, 154, 147, 250, 15, 17; 252/8.57, 8.9, 395, 406

[56] References Cited

U.S. PATENT DOCUMENTS

| | | | |
|---|---|---|---|
| 3,819,666 | 6/1974 | Kleiner et al. | 268/481 X |
| 3,935,277 | 1/1976 | Dear et al. | 260/481 X |
| 3,940,435 | 2/1976 | Hiestand | 260/481 R |

*Primary Examiner*—Michael R. Lusignan
*Attorney, Agent, or Firm*—Beveridge, DeGrandi, Kline & Lunsford

[57] ABSTRACT

New fluorinated telomerization products are disclosed which are products produced by the reaction of:
a. one mole of an ester of one or more acids of the formula $$HS-A(COOH)_n \qquad (I)$$

with one or more polyols, and
b. 1 to 5 moles of one or more compounds possessing at least one ethylenic bond, one at least of these compounds conforming to the general formula $$Rf-B-\underset{R}{\underset{|}{C}}=CH-R \qquad (II)$$

In formulae (I) and (II), A represents a hydrocarbon radical which may contain atoms of oxygen, nitrogen, phosphorus, sulphur or halogen, n is a whole number from 1 to 4, Rf is a perfluorinated chain containing 1 to 20 carbon atoms, B is a bivalent chain, one of the symbols R represents a hydrogen atom and the other a hydrogen atom or an alkyl group containing 1 to 4 carbon atoms. These products when applied to substrates, such as textile fabrics, confer on them a permanent anti-stain and soil release finish while permitting easy elimination of soil by washing.

32 Claims, No Drawings

FLUORINATED ANTI-STAIN AND SOIL RELEASE FINISHES

The present invention relates to new fluorinated products, their manufacture and their use in the preparation of anti-staining and soil release finishes for various materials, such as paper, leather, wood, metals, concrete and more particularly, textiles, woven or nonwoven, natural, artificial or synthetic fibers and filaments.

Fluorinated derivatives are known as being particularly useful for the treatment of a wide range of substrates, in particular fabrics and paper, to render them hydrophobic and olephobic, i.e. to give them resistance to staining by either water, oil or fatty products.

However, if the substrates so treated should become soiled, e.g. by the forcible deposit of soiling substances, they are particularly difficult to wash in an aqueous medium even when the water contains a detergent, because the medium imperfectly wets the substrate. For this reason normal procedures are not adequately effective for removing stains from substrates treated with the prior known materials.

This problem is particularly troublesome when dealing with articles such as shirts, dresses, children's clothing, work clothes, table linen and the like, which are intended to be washed on a regular basis. The same applies with respect to certain wall papers, wall coverings or floor coverings, which are intended to be cleaned with a soap solution.

To overcome this disadvantage, certain fluorinated derivatives have been modified in such a way as to confer on them a hydrophilic character. Copolymers of perfluoroalkoxyalkyl siloxane and alkyleneoxy alkyl siloxane have been proposed for this purpose. Also, in U.S. Pat. No. 3,759,874 and No. 3,575,899, the use of fluorinated polyurethanes has been proposed.

Other compounds have been suggested for the same purpose as in U.S. Pat. No. 3,598,514 and No. 3,598,515 where it is disclosed to employ fluorinated copolymers or perfluorinated alcohols cross-linked with condensates of alkylene oxide with the help of aminoplasts.

Along these same lines, it has been proposed to use copolymers of perfluorinated monomers and glycol acrylates or acrylates of glycol derivatives (U.S. Pat. No. 3,816,167 and No. 3,654,244) or copolymers based on fluorinated compounds and anhydrides (U.S. Pat. No. 3,585,169; French Pat. No. 2,126,233 and French Pat. No. 2,230,791).

It has also been proposed in French Pat. No. 1,562,070 to use hybrid copolymers of high molecular weight, as block or graft copolymers, based on hydrophilic fragments and fluorinated fragements, prepared by polymerization of a fluorinated ethylenic monomer in the presence of a prepolymer obtained by the reaction of a diacrylic monomer and a dithiol. Another system is shown in French Pat. No. 2,204,621 which recommends the use of compositions based on addition compounds obtained by the reaction of a fluorinated itaconate or fumarate with fluorinated or non-fluorinated mercaptans.

Unfortunately, the majority of the substrates treated with the products proposed in this prior art have the disadvantage of having an insufficient hydrophobic character, considering the amount of fluorine deposited, and above all, the treated substrates lose their anti-staining properties after a number of washings. This disadvantage is of great importance when one is dealing with articles which are intended to undergo repeated washings and laundering.

It has therefore been the object of the invention to prepare fluorinated products which confer on the products to which they are applied, not only a stain repellant effect, but also a soil release effect in the sense defined by I. Niemann in the review entitled "Textiles Chimique" No. 4 of April 1969, page 211, so that this finish possesses the additional property of facilitating the removal of soiling substances by washing and of retaining all of these properties after repeated washing or dry cleaning.

New fluorinated products have now been disclosed according to the invention which when applied to various substrates, confer on them, with only a small amount of deposited fluorine, a character which is at the same time hydrophobic and oleophobic. Surfaces treated according to the invention resist the spreading and penetration of liquids of aqueous or oily origin, and also possess a good hydrophilic character under certain conditions, notably in the presence of the products used in washing in aqueous media. In spite of this hydrophilic character, it has been found, surprisingly, that essentially all of these properties are retained even after a relatively large number of washes.

This property is particularly advantageous for polyester/cotton or polyester/viscose fabrics, which are intended to be washed frequently and are known to soil easily, particularly if they have previously been subjected to "wash and wear" or "permanent press" treatments or finishes.

The new fluorinated products according to the invention result from the reaction of:

(a) a mole of an ester of one or more acids of the formula:

$$\text{HS—A (COOH)}_n \tag{I}$$

with one or more polyols, and (b) one to five moles of one or more compounds possessing at least one ethylenic bond, one at least of these compounds corresponding to the formula:

$$\text{Rf—B—C(R)=CH—R} \tag{II}$$

In formulae (I) and (II), the symbol A represents an aliphatic or cyclic hydrocarbon radical which may contain atoms of oxygen, nitrogen, phosphorus, sulphur or halogen, n is a whole number from 1 to 4, Rf represents a perfluorinated chain, straight or branched, containing 1 to 20, preferably 2 to 10, carbon atoms, B represents a bivalent organic chain, one of the symbols R represents a hydrogen atom and the other a hydrogen atom or an alkyl group containing 1 to 4 carbon atoms.

The fluorinated products according to the invention may be prepared by telomerization or cotelomerization, in solvent or non-solvent medium, the ester defined under (a) playing the part of telogen and the ethylenic compounds defined under (b) playing the part of taxogens. Telomerization reactions are well known in the art.

The process may be carried out in the presence of ionic catalysts (cationic or anionic), such as boron trifluoride, aluminum chloride and sodium methylate, but preferably in the presence of radical catalysts, such as peroxygenated compounds, like sodium, ammonium or potassium persulphate, alkali perborates, hydrogen peroxide, sodium or barium peroxide, cumene hydroperoxide, tert.-butyl hydroperoxide, benzoyl peroxide, tert.-butyl perbenzoate, diacetyl peroxide, tert.-butyl perpivalate, peracetic acid, amine oxides, ceric nitrate, ammonium nitrate, azo compounds such as 2,2′-azo bis-isobutyronitrile, 2,2′azo bis-(2,4-dimethyl 4-methoxy valeronitrile), 4,4′azo bis-(4-cyano pentanoic) acid or its alkali salts and the dichlorohydrate of 2,2′azo di-isobutylamidine, or of photo-initiators used in the presence of uv radiation, such as derivatives of benzoin, benzophenone, 2-methyl anthraquinone and benzil. Other catalysts will be apparent to persons skilled in the art from the foregoing.

The amount of catalyst to be used may vary from about 0.01 to about 5% of the weight of the ethylenic compound taken, preferably about 0.1 to about 1.5%.

When the mole ratio between the ester defined under (a) and the ethylenic compound defined under (b) is equal to 1, the products of the invention may be prepared, according to processes which are themselves known, by condensation in the presence or absence of basic catalysts, such as sodium, sodium methylate, sodium or potassium hydroxide, piperidine, benzyl trimethyl ammonium hydroxide, pyridine, N-methylmorpholine, triethylene diamine, triethylamine.

The telomerization or condensation reactions are generally carried out at a pH of 2 to 11 and at a temperature between 40° and 120° C., preferably between 50° and 90° C. It is however possible to work at higher or lower temperatures. For example, redox catalysts, such as the systems persulphate-ferrous salt, persulphate-sodium hydroxymethanesulphinate, hydrogen peroxide-bisulphite or hydrogen peroxide-butane 2,3-dione, may be used to accelerate the reaction or reduce the temperature of telomerization. Finally, assuming the use of an adquate apparatus, the process may be carried out in a discontinuous, continuous or progressive manner.

In general, the various reactions are known and described, for example, in the following references:

"Monomeric Acrylic Esters" by H. Riddle, Reinhold Publishing Corp. (1965), pages 149-151.

G. Nagy "L'industry Chimique", No. 570, Jan. 1965, pp. 1–6.

R. B. Fox and De Field, U.S. Naval Research Laboratory, Washington, NRL Report 5190, Nov. 19, 1958.

M. S. Karasch and C. F. Focus, J. Org. Chem., 13 1948, pp. 97–100.

The esters (a) to be used in the preparation of the fluorinated products according to the invention may be obtained by esterification of an acid of formula (I), preferably thioglycolic acid, or a mixture of acids of formula (I), with one or more polyols.

Those which are particularly advantageous are the esters obtained by using as the polyols the poly-(oxyalkylene) glycols, such as the poly-(oxyethylene) glycols known on the market under the name EMKAPOL the poly-(oxypropylene) glycols known under the name EMKAPYL and the poly-(oxyethylene-oxypropyleneoxyethylene) glycols known under the name PLURONIC, or the products of condensation of alkylene oxides with amino alcohols or with amines such as ethylene diamine, products known on the market under the name of TETRONIC.

However, other polyols can also be used, such as, for example; ethylene glycol, diethylene glycol, triethylene glycol, propane 1,2-diol, propane 1,3-diol, dipropylene glycol, thiodiethylene glycol, pinacol, butane 1,2-diol, butane 1,4-diol hexylene glycol, decane 1,10-diol, o-phthalic glycol, hydrobenzoin, glycerol, butane 1,2,4-triol, hexane 1,2,6-triol, erythrol, trierythritol, arabitol, sorbitol, manitol, inositols, glucides, oses and polyoses such as glucose, fructose, mannose, maltose, galactose, saccharose, amino alcohols such as diethanolamine, dimethanolamine, triethanolamine, diisopropanolamine, triisopropanolamine, monomethyldiethanolamine, monophenyldiethanolamine.

Preferred polyfluorinated ethylenic compounds of formula (II) are those corresponding to the formula:

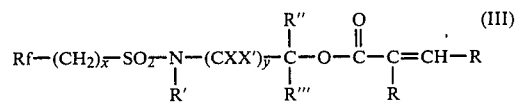

where R and Rf are as defined above;

x is a whole number between 1 and 20, preferably 2 or 4;

y is a whole number from 1 to 4, preferably 1 or 2;

R′ is a hydrogen atom or an alkyl group containing 1 to 10 carbon atoms, cycloalkyl containing 5 to 12 carbon atoms, hydroxyalkyl groups containing 2 to 4 carbon atoms or aryl groups which may be substituted by an alkyl radical containing 1 to 6 carbon atoms;

R″, R‴, X and X′ may be the same or different and represent hydrogen atoms or alkyl groups containing 1 to 4 carbon atoms.

These polyfluorinated monomers of formula (III) may be prepared by known processes, e.g. by esterification of alcohols of the formula:

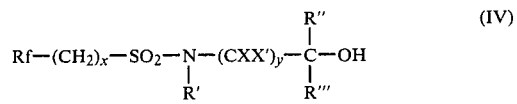

by means of an alkene monocarboxylic acid of formula

such as acrylic, methacrylic or crotonic acid, in the presence of acid catalysts, such as sulphuric acid or p-toluenesulhponic acid. The anhydrides or halogenides of the acids of formula (V) may also be used. Representative preparative methods are described in French Pat. No. 2,034,142.

As further examples of polyfluorinated ethylenic compounds may be cited:

1. the esters of acids of formula (V) with the alcohols and thiols of the following formulae:

(VI) Rf—OH (VII) Rf—(C X X′)$_x$—OH (VIII) Rf—(C X X′)$_x$—(O—C$_2$H$_2$X X′)$_z$-OH (IX) Rf—(C X X′)$_x$—O—(CX X′)$_y$—OH (X) Rf—(C X X′)$_x$—S—(C X X′)$_y$—OH (XI) Rf—(C X X′)$_x$—SH (XII) Rf—(C X X')$_x$—SO$_2$—(C X X')$_y$—OH
(XIII) Rf—SO$_2$—(C X X')$_x$—OH
(XIV) Rf—CH=CH—CH$_2$—(O C$_2$H$_2$ X X')$_z$—OH
(XV) Rf—CH=CH—(C X X')$_x$—OH
(XVI) Rf—CF=CH—CH=CH—(OC$_2$H$_2$ X X')$_z$—OH $$\text{Rf}-\text{SO}_2-\underset{\underset{R'}{|}}{N}-(CXX')_x-OH \quad \text{(XVII)}$$

$$\text{Rf}-\text{SO}_2-\underset{\underset{R'}{|}}{N}-(CXX')_x-\underset{\underset{R'''}{|}}{\overset{\overset{R''}{|}}{C}}-OH \quad \text{(XVIII)}$$

Rf—CO$_2$—(CXX')$_x$—OH  (XIX)
Rf—CO—(CXX')$_x$—OH  (XX)

$$\text{Rf}-\text{CO}-\underset{\underset{R'}{|}}{N}-(CXX')_x-OH \quad \text{(XXI)}$$

2. monomers of the formula:

$$\text{Rf}-\text{SO}_2-(CXX')_x-\underset{\underset{R}{|}}{C}=CH_2 \quad \text{(XXII)}$$

Rf—O—CH=CH$_2$  (XXIII)

$$\text{Rf}-\text{CO}_2-(CXX')_x-\underset{\underset{R}{|}}{C}=CH_2 \quad \text{(XXIV)}$$

$$\text{Rf}-(CH_2)_x-\underset{\underset{R'}{|}}{N}-CO-\underset{\underset{R}{|}}{C}=CH_2 \quad \text{(XXV)}$$

$$\text{Rf}-\text{SO}_2-\underset{\underset{R'}{|}}{N}-CO-\underset{\underset{R}{|}}{C}=CH_2 \quad \text{(XXVI)}$$

$$\text{Rf}-\text{CO}-\underset{\underset{R'}{|}}{N}-CO-\underset{\underset{R}{|}}{C}=CH_2 \quad \text{(XXVII)}$$

$$\text{Rf CO}-\underset{\underset{R'}{|}}{N}-(CXX')_x-\underset{\underset{R''}{|}}{N}-CO-\underset{\underset{R}{|}}{C}=CH_2 \quad \text{(XXVIII)}$$

$$\text{Rf}-\text{CO}-\underset{\underset{R'}{|}}{N}-\underset{\underset{R}{|}}{C}=CH_2 \quad \text{(XXIX)}$$

In the formulae (VI) to (XXIX), x, y, Rf, R, R', R", R''', X, X' have the same meaning as above and z is a whole number from 1 to 10.

In accordance with another aspect of the invention, other monomeric compounds or taxogens, without perfluorinated groups, and which have at least one ethylenic bond may be used in admixture with the compounds of formula (II). The following are illustrative of representative compounds that may be used in this embodiment of the invention:

lower olefinic hydrocarbons, halogenated or nonhalogenated, such as ethylene, propylene, isobutene, 3-chloroisobutene-1, butadiene, isoprene, chloro and dichlorobutadiene, fluoro and difluorobutadiene, 2,5-dimethyl-1,5-hexadiene;

vinyl, allyl or vinylidene halides, such as vinyl or vinylidene chloride, vinyl or vinylidene fluoride, allyl bromide;

styrene and its derivatives, such as vinyl toluene, α-methyl styrene, α-cyanomethyl styrene, divinyl benzene;

vinyl esters, such as vinyl acetate, vinyl propionate, vinyl esters of the acids known on the market under the name of "Versatic acids", vinyl isobutyrate, senecioate, succinate, isodecanoate, stearate;

allyl esters, such as allyl acetate, allylheptanoate;

alkyl vinyl ethers, such as cetyl vinyl ether, dodecyl vinyl ether;

vinyl alkyl ketones, such as vinyl methyl ketone;

unsaturated acids, such as acrylic acid, methacrylic acid, α-chloroacrylic acid, crotonic acid, maleic acid, fumaric acid, itaconic acid, citraconic acid and senecioic acid, their anhydrides and their esters, such as the acrylates and methacrylates of vinyl, allyl, methyl, butyl, isobutyl, hexyl, heptyl, 2-ethylhexyl, lauryl, stearyl and cellosolve; dimethyl maleate, ethyl crotonate, monomethyl maleate, monobutyl itaconate;

acrylonitrile, methacrylonitrile, 2-chloro-acrylonitrile, 2-cyano-ethyl acrylate, methylene-glutaronitrile, vinylidene cyanide, N-vinyl-carbazole, vinyl-pyrrolidone, tetra-alkyloxyethane, diacrylates and dimethacrylates of ethylene glycol and propylene glycol, divinyl carbinol, tris-acryloyl hexahydro-s-triazine, bis-(methacryloyloxyethyl) hydrogen phosphate, divinyl carbonate, the triallyl ether of pentaerythritol.

One can also use in admixture with the compounds of formula (II), monomers or taxogens which have at least one reactive group, i.e. a group capable of reacting with another monomer or taxogen, another compound or the substrate itself to establish cross-linking. These reactive groups are well known and may be polar groups or functional groups, such as the groups: OH, NH$_2$, NH-alkyl, COOMe (Me=alkali metal), $$SO_3H, \quad CH\overset{\diagdown\;\;\diagup}{\underset{O}{-}}CH_2,$$

CN, CHO, $$\overset{\diagdown}{\underset{\diagup}{C}}-Cl, \overset{\diagdown}{\underset{\diagup}{C}}-Br,$$

—SO$_2$—CH=CH$_2$, —NH—CO—CH=CH$_2$, and the like.

Illustrative monomers are: hydroxyalkyl acrylates and methacrylates, such as ethylene glycol monoacrylate, propylene glycol monacrylate, acrylates and methacrylates of polyalkylene glycols, allyl alcohol, allyl glycolate, isobutene diol, allyloxy ethanol, acrylamide and methacrylamide, maleamide and maleimide, N-(cyanoethyl)-acrylamide, N-isopropyl acrylamide, diacetone acrylamide, N-(hydroxymethyl) acrylamide and methacrylamide, N-(alkoxymethyl) acrylamides and methacrylamides, the hydroxymethyl derivatives of 2-vinyl-4,6-diamino-s.triazine and isobutene diol carbamate, sodium acrylate or methacrylate, vinylsulphonic acid and styrene-p-sulphonic acid and their alkali salts, 3-aminocrotononitrile, mono-allyl-amine, the vinylpyridines, glycidyl acrylate or methacrylate, allyl glycidyl ether, alkyl cyanoacrylates, such as isopropyl cyanoacrylate, dimethylaminoethyl acrylate and methacrylate, acrolein, acryloyl chloride.

The new products according to the invention may be prepared in the presence or absence of solvents; e.g. water and organic solvents such as acetone, methyl-ethyl ketone, γ-butyrolactone, methanol, ethylene glycol, diacetone-alcohol, isophorone, tetrahydrofurane, acetic acid, ethylacetate, dialkyl ethers, ethylene glycol monomethy or monoethyl ether, ethylene glycol dimethyl or diethyl ether, dioxane, formamide, dimethyl formamide, dimethylsulphoxide, hexamethyl phosphorotriamide, N-methyl-2-pyrrolidone, the N-oxide of pyridine, of 2-picoline or or trimethylamine, trichlorotrifluoroethane, hexafluoroxylene, trifluorotoluene. These solvents are inert with respect to the starting materials, the reaction and the final products.

Optionally, the new products according to the invention may also be prepared in the presence of surface active agents, fluorinated or not, anionic, cationic or amphoteric, or a mixture of such agents.

It is also possible to use colloids, such as polyvinyl alcohol, carboxymethyl cellulose, methyl cellulose, hydroxyethylcellulose, sodium alginate, acrylic or methacrylic polymers or copolymers and their water-soluble salts, styrene-maleic anhydride copolymers, diisobutene-maleic anhydride copolymers or their salts in the reaction system.

Finally, other ingredients may be added, well known in the technique of polymerization or telomerization; such as: chelating agents, buffers, salts of mineral or organic acids, additives to control the pH and molecular weight, hydrotropic agents, stabilizers. These are routine matters which will be apparent to those having ordinary skill in the art.

The products according to the invention have a very low degree of polymerization, and consequently a relatively low molecular weight. In general they have the form of liquids, pastes or waxes and are of low consistency. On the other hand, they may be obtained in solution or not in the form of dispersions or in an emulsifiable or autoemulsifiable medium.

The proportion of dry matter of the new compositions of the invention; i.e. the solids content, may vary within very wide limits. It is however, advantageous to use products of which the dry solids content is between 20 and 80% by weight.

Illustrative substrates which may be rendered oleophobic and hydrophobic with the products according to the invention are the following: woven or nonwoven articles based on cellulose or regenerated cellulose, natural, artificial or synthetic fibers, such as cotton, cellulose acetate, wool, silk, polyamide, polyester, polyolefin, polyurethane or polyacrylonitrile fibers. Also included are: paper, card, leather, plastic materials, glass, wood, metals, porcelain, masonry, painted surfaces.

In applying them to the surface or substrate to be treated, the products according to the invention may be used in the form of solutions or dispersions, in aqueous medium, inert organic in solvent medium or in a mixture of water and inert organic solvents. Any suitable inert carrier or vehicle may be used. Known techniques may be used as; for example, coating, impregnation, immersion, spraying, brushing, fulling, film-coating and the like. The amount of fluorinated product in the composition can vary widely depending upon convenience. The range of concentrations is not critical but is merely a matter well within the scope of the skilled worker. The articles thus treated may be subjected to drying and, if required, to a heat treatment at a temperature between; for example, 100° C. and 230° C.

To obtain good fixation of the compositions containing the products of the invention on the substrates to which they are applied and; for example, in the case of woven materials, to give them a particular finish effect, it is sometimes advantageous and even desirable to combine them with certain additives, thermosetting products and catalysts capable of promoting cross-linking with the support.

For example, there may be used in accordance with this embodiment of the invention condensates or precondensates of urea or of melamine formaldehyde, methylol dihydroxy ethylene urea and its derivatives, urones, methylol ethylene urea, methylol propylene urea, methylol triazones, methylol carbamates, methylol acrylamides or methacrylamides, their polymers or copolymers, divinyl sulphone, epoxy derivatives such as diglycidyl glycerol, certain halogenated derivatives such as chloro-epoxy propane and dichloropropanol or polar compounds such as the disodium salt of trisulphato-hydroxy-ethyl-sulphonium betain and the pyridinium salt of the chloromethyl ether of ethylene glycol.

In addition, if it is desired to augment the hydrophobic character of substrates treated with the products according to the invention, they may be used in conjunction with certain water-repellent agents such as emulsions of paraffin wax, natural or synthetic waxes, silicones, the chlorohydrates of stearaminomethyl pyridinium, condensates of compounds with aliphatic chains with derivatives of melamine or urea, such as the product obtained by reacting stearic acid with hexa-(methoxymethyl) melamine, triethanolamine and acetic acid. One may also use the salts of mineral or organic acids, such as aluminium acetate, aluminium formate, aluminium stearate, zirconium acetate, zirconium carbonate, zirconium oxychloride, or Werner complexes such as chromium stearatochloride.

Finally, in order to obtain certain effects, the fluorinated products of the invention may also be used in combination with other fluorinated products such as those described in French Pat. No. 2,175,332 and U.S. Pat. No. 3,870,767 or with polymers or auxilliary products such as vinyl or acrylic polymers or copolymers for example in the form of latex, polyalkylenes, polyglycols, softening agents, buffers, colloids, fire-proofing agents, antistatic agents, fungicides, optical whitening agents, sequestering agents, surface active agents and carriers or swelling agents which can facilitate the penetration of the fluorinated copolymers into the fivers, in particular cellulose fibers, using polyalkylene glycol ethers or diethylene sulphone.

In addition to their applications as "antistaining" or "soil release" finishes, the products of this invention may also be used for other purposes, such as textile printing or the coloring of textiles by pigments, oiling or sizing of textile fibers, or to obtain special properties such as anti-static or antipilling effects. On substrates such as paper, wood, metals or plastics one can obtain properties of interest for mould release, prevention of corrosion and problems relating to anti-adhesion.

To determine the "anti-staining" properties of the substrates treated with the products according to the invention, their oleophobic and hydrophobic character must be determined.

The oleophobic character may be measured, for example for textile articles by using the "3 M test" described by E. J. Grajeck and W. H. Petersen in "Textile Research Journal" 32 (1962) 323, but in the following examples it is preferable to use the method described in "AATCC Technical Manual" Test Method 118—1972, which evaluates the non-wettability of the substrate by means of a series of oily liquids with progressively lower surface tensions (Textile Research Journal, May 1969, p. 451).

| Rating test liquids for measurement of oleophobic character | Surface tension dynes/cm at 25° C. |
| --- | --- |
| 1 Nujol | 31.5 |
| 2 Nujol/n-hexadecane (65/35 by vol) | 29.6 |
| 3 n-hexadecane | 27.3 |
| 4 n-tetradecane | 26.4 |
| 5 n-dodecane | 24.7 |
| 6 n-decane | 23.5 |
| 7 n-octane | 21.4 |
| 8 n-heptane | 19.8 |

The hydrophobic character may be measured by using the wetting resistance test used essentially as a control test for the water-proofing treatment of fabrics (Spray Test, AATCC Technical Manual—Test Method 22—1971), but it is more normal and logical to use a test similar to the oleophobic test cited above, so that the non-wettability of the substrate is evaluated by means of a series of aqueous liquids with progressively lower surface tensions. In the following, the procedure used is that described in the standard AATCC 118-1972, but using aqueous solutions of a fluorinated surface active agent of the formula:

$$C_6F_{13}—(C_2H_4O)_{10}—H \qquad (XXX)$$

| Rating Test liquids for measurement of hydrophobic character | Surface tension dynes/cm at 25° C. |
| --- | --- |
| 1 Aqueous solution of XXX: 0.0030% | 32 |
| 2 Aqueous solution of XXX: 0.0040% | 30 |
| 3 Aqueous solution of XXX: 0.0070% | 27 |
| 4 Aqueous solution of XXX: 0.0080% | 26 |
| 5 Aqueous solution of XXX: 0.0090% | 25 |
| 6 Aqueous solution of XXX: 0.013% | 23.5 |
| 7 Aqueous solution of XXX: 0.022% | 21.5 |
| 8 Aqueous solution of XXX: 0.033% | 20 |

To determine the wettability of the substrates, particularly fabrics treated with the products of the invention, the method is used described by K. Lindner in "Tenside Textilhilfsmittel Waschrohstoffe" Band II, 1964 edition, page 1805, paragraph 5. The time is measured for total immersion of a specimen of the fabric, 2.54×2.54 cm, laid carefully on the surface of an aqueous solution of 1.4 g/l of sodium butylnaphthalene sulphonate. The wettability for the given substrate is then expressed directly as "time for wetting" in this solution. By testing at 20° C. and at 60° C. it is possible to demonstrate the non-wettability of the substrate at ambient temperature and conversely the good wettability of the same substrate under the relatively mild conditions of domestic laundering.

To determine the ease of removal of stains, washing test II at 50° C., "Soil release" described in "AATCC Technical Manual" Test Method 130-1970 may be used. The rating scale is 5 to 1.

Finally, to determine the retention of the desired property after repeated washing in aqueous medium (L), the treated samples can be washed in a domestic washing machine of the type "Lincoln Velyette Prestige", top loading and fitted with a drum. Each wash is carried out with 12 liters of water and 60 g of the detergent "Dash all temperatures" (i.e. 5 g/l). The wash is carried out for 30 minutes at 60° C. in the presence of 2 kg of cotton fabric, then finished with 3 rinses of cold water at 37° THF. The washed fabrics are dried and ironed before being tested again.

For dry cleaning, (NS), the treated specimens are immersed in a bath of perchloroethylene at 20° C. for 1 hour. After spin drying the fabrics are dried and ironed before being tested again.

The following examples, in which the percentages given are by weight, illustrate the invention.

The symbols 0L, 3L, 6L, 3NS, 6NS etc. mean respectively: unwashed (0L), after 3 washings (3L), after 6 washings (6L), after 3 dry cleanings (3NS), after 6 dry cleanings (6NS) etc.

EXAMPLE 1

A glass reactor of 1000 cm$^3$ capacity, equipped with a stirrer, a condenser with separator and a heater is charged with 600 g (1 mol) of polyoxyethylene glycol of molecular weight 600 (known under the name Emkapol 600), 115 g (1 mol) of 80% thioglycolic acid, 1 g of paratoluenesulphonic acid and 600 g of toluene. This is heated to boiling and 41 g of water is driven off by azeotropic entrainment. After removal of the toluene by distillation, 674 g of the monoester of the thioglycolic acid and the polyoxyethylene glycol mentioned above is obtained. The crystallizing point of this liquid product, which is soluble in water is 10° C.

Another glass reactor of 500 cm$^3$ capacity, fitted with a stirrer, a reflux condenser and a heater is charged with 40.5 g (0.075 mol) of the polyfluorinated monomer of the formula

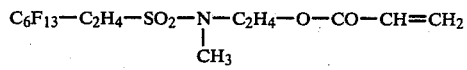
$$C_6F_{13}—C_2H_4—SO_2—\underset{\underset{CH_3}{|}}{N}—C_2H_4—O—CO—CH\!=\!CH_2$$

34 g (0.05 mol) of the thioglycolic ester previously obtained and 200 g of acetone. The mixture is heated to 60° C. then 0.5 g of tert.butyl perpivalate and 0.5 g tert.butyl peroctoate are added and allowed to react for 15 hours at 60° C. After cooling 270 g of a solution ($S_1$) of telomer according to the invention is obtained. This solution which is auto-emulsifiable in water has a dry solids content of 28% and a fluorine content of 7%. The telomer obtained is not solid; it is obtained in the form of a paste with a liquifaction point about 70° C.

This product is applied to a fabric for comparison with a mixture of perfluorinated copolymers prepared by the process described in example 2 of French Pat. No. 2,175,332, which confers only an oil repellent and water repellent finish. For this purpose, two fulling baths are prepared having the following composition (in g/l).

| Fulling baths | A | B |
| --- | --- | --- |
| Solution ($S_1$), 28% dry matter | 43 | |
| Mixture of dispersions of polyfluorinated copolymers according to example 2 of the French Patent 2,175,332 (28% dry matter) (see example 2 Serial No. 339,668 filed March 9th, 1973) | | 43 |
| Water | 865 | 865 |
| 65% aq. solution of a precondensate of hexamethylol trimethyl ether-melamine | 80 | 80 |
| Magnesium chloride hexahydrate | 12 | 12 |

Two samples of a mixed fabric of polyester/cotton (66/33) are fulled under the same conditions in the baths A and B with a rate of extraction of about 70%. After drying, the fabrics are treated for 3 minutes at 165° C. by means of a Benz thermal condenser.

The characteristics of the two fabrics treated in these ways are shown in the following table in comparison with a reference, untreated, fabric (NT).

| Character-istics | Treatment | 0L | 3L | 6L | 9L | 3 NS |
|---|---|---|---|---|---|---|
| oleophobic | A | 8 | 6 | 5 | 2 | 6 |
|  | B | 5 | 2 | 1 | 0 | 5 |
|  | NT | 0 | 0 | 0 | 0 | 0 |
| hydrophobic | A | 8 | 8 | 8 | 8 | 8 |
|  | B | 8 | 8 | 8 | 8 | 8 |
|  | NT | 0 | 0 | 0 | 0 | 0 |
| Spray test | A | 70 | 80 | 70 | 70 | 70 |
|  | B | 100 | 80 | 80 | 80 | 100 |
|  | NT | 0 | 0 | 0 | 0 | 0 |
| Wettability at 20°C. | A | >1 h | >1 h | >1 h | 24 min | >1 h |
|  | B | >1 h | >1 h | >1 h | 1 h | >1 h |
|  | NT | 2 sec | 2 sec | 2 sec | 2 sec | 2 sec |
| Wettability at 60° C. | A | 378 sec | 162 sec | 35 sec | 100 sec | 300 sec |
|  | B | >1 h | >1 h | >1 h | >1 h | >1 h |
|  | NT | 2 sec | 2 sec | 2 sec | 2 sec | 2 sec |
| Soil release | A | 5 | 5 | 5 | 5 | 5 |
|  | B | 1 | 1 | 1 | 1 | 1 |
|  | NT | 1 | 1 | 1 | 1 | 1 |

Examination of the results in the table above show that the fabric treated in bath A according to the present invention is hydrophobic and oleophobic at ambient temperature and that its wettability at 60° C. is good, which facilitates removal of the soil.

EXAMPLE 2

A glass reactor of 2000 cm$^3$, fitted with a stirrer, a condenser with separator and a heater, is charged with 1000 g (1 mol) of polyoxyethylene glycol of molecular weight 1000 (known under the name Emkapol 1000), 230 g (2 mol) of 80% thioglycolic acid, 1 g of paratoluenesulphomic acid and 600 g of toluene. This is heated to boiling and 82 g of water is removed by azeotropic entrainment. After distilling off the toluene, one obtains 1140 g of the diester of the thioglycolic acid and polyoxyethylene glycol above. The crystallizing point of this liquid product, which is soluble in water is 29° C.

A glass reactor of 500 cm$^3$ fitted with a stirrer, a reflux condenser and a heater is charged with 64 g (0.1 mol) of the polyfluorinated monomer of the formula:

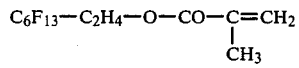

$$C_8F_{17}-C_2H_4-SO_2-N-C_2H_4O-CO-CH=CH_2$$
$$|$$
$$CH_3$$

115 g (0.1 mol) of the above dithioglycolate and 400 g of dioxane. The mixture is heated to 80° C. then 4 g tert-.butyl hydroperoxide is added and allowed to react for 12 hours at 80° C. After cooling, one obtains 580 g of a solution (S$_2$) of telomer according to the invention. This solution, which is miscible with water has a proportion of dry matter of 31% and a proportion of fluorine of 5.7%.

This telomer is obtained in the form of a paste of low consistency with a liquifaction point of about 50° C.

A mixed polyester/cotton (66/33) fabric is fulled in an aqueous bath containing 180 g/l of solution S$_2$ above, 80 g of a 65% aqueous solution of a precondensate of hexamethylol trimethyl ether-melamine and 24 g of magnesium chloride hexahydrate with a rate of extraction of about 70%. The fabric is then treated for 3 minutes at 165° C. in a thermal condenser.

The characteristics of the fabric so treated (T) are shown in the following table in comparison with those of an untreated reference fabric (NT).

| Character-istic | Treatment | 0L | 3L | 6L | 3NS | 6NS | 9NS | 12NS |
|---|---|---|---|---|---|---|---|---|
| Oleophobic | T | 8 | 7 | 3 | 8 | 8 | 6 | 6 |
|  | NT | 0 | 0 | 0 | 0 | 0 | 0 | 0 |
| Hydrophobic | T | 8 | 8 | 8 | 8 | 8 | 8 | 8 |
|  | NT | 0 | 0 | 0 | 0 | 0 | 0 | 0 |
| Spray test | T | 70 | 70 | 70 | 70 | 70 | 70 | 70 |
|  | NT | 0 | 0 | 0 | 0 | 0 | 0 | 0 |
| Soil release | T | 5 | 5 | 4 | 5 | 5 | 5 | 5 |
|  | NT | 1 | 1 | 1 | 1 | 1 | 1 | 1 |

EXAMPLE 3

A glass reactor of 500 cm$^3$ fitted with a stirrer, a reflux condenser and a heater is charged with 43.2 g (0.1 mol) of polyfluorinated monomer of the formula:

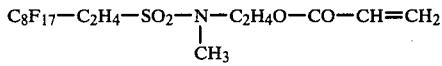

$$C_6F_{13}-C_2H_4-O-CO-C=CH_2$$
$$|$$
$$CH_3$$

67.4 g of (0.1 mol) of the thioglycolic ester of example 1, 260 g of dioxane and 2 g of tert.butyl perpivalate. The mixture is heated to 80° C. and allowed to react for 12 hours at this temperature. After cooling, one obtains 370 g of a solution (S$_3$) of telomer according to the invention. This solution which is auto-emulsifiable in water, has a proportion of dry matter of 30% and a proportion of fluorine of 6.8%. The telomer is of low consistency; it is obtained in the form of a paste of which the liquifaction point is about 9° C.

A polyester/cotton fabric is fulled in a bath containing 180 g/l of the solution S$_3$ above, 80 g of a 65% aqueous solution of a precondensate of hexamethylol trimethyl ethermelamine and 24 g of magnesium chloride hexahydrate. After squeezing with an extration rate of about 73%, the fabric is treated for 3 minutes at 165° C. in a thermal fixer. The characteristics of the fabric treated in this way (T) are shown in the following table in comparison with untreated reference fabric (NT).

| Characteristic | Treatment | 0L | 3L | 6L | 3NS |
|---|---|---|---|---|---|
| Oleophobic | T | 6 | 4 | 1 | 6 |
|  | NT | 0 | 0 | 0 | 0 |
| Spray test | T | 70 | 70 | 70 | 70 |
|  | NT | 0 | 0 | 0 | 0 |
| Soil release | T | 5 | 5 | 3 | 5 |
|  | NT | 1 | 1 | 1 | 1 |

The fabric treated with the product of the invention shows an oleophobic and hydrophobic character, while still allowing good elimination of the soiling substances.

EXAMPLE 4

A glass reactor of 500 cm$^3$ fitted with a stirrer, a reflux condenser and a heater is charged with 27 g (0.05 mol) of the polyfluorinated monomer of the formula:

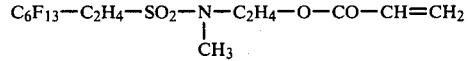

$$C_6F_{13}-C_2H_4-SO_2-N-C_2H_4-O-CO-CH=CH_2$$
$$|$$
$$CH_3$$

34 g (0.05 mol) of the thioglycolic ester of example 1 and 170 g of dioxane. The mixture is heated to 80° C. 2 g of triethylamine is added and the reaction allowed to proceed for 10 hours at this temperature. After cooling, 230 g of a solution ($S_4$) of a condensate according to the invention is obtained. This solution which is auto-emulsifiable in water has a dry solids content of 25% and a fluorine content of 5.1%. The condensate is of low consistency and is obtained in the form of a paste with a liquifaction point of about 40° C.

The product is applied to a mixed polyester/cotton fabric (66/33) by fulling in an aqueous bath containing 120 g/l of the above solution ($S_4$), 60 g of a 65% aqueous solution of a precondensate of hexamethylol trimethyl ether-melamine and 18 g of magnesium chloride hexahydrate.

After squeezing with an extraction of about 70%, the fabric is treated for 3 minutes at 165° C. by means of a Benz thermal condenser. The characteristics of the fabric treated in this way (T) are shown in the following table in comparison with those of a reference untreated fabric (NT).

| Characteristics | Treatment | 0L | 3L | 6L | 9L | 12L |
|---|---|---|---|---|---|---|
| Oleophobic | T | 8 | 7 | 5 | 3 | 2 |
|  | NT | 0 | 0 | 0 | 0 | 0 |
| Hydrophobic | T | 8 | 8 | 8 | 8 | 8 |
|  | NT | 0 | 0 | 0 | 0 | 0 |
| Wettability at 20° C. | T | >1 h | >1 h | 40 min | 40 min | 22 min |
|  | NT | 2 sec | 2 sec | 2 sec | 2 sec | 2 sec |
| Wettability at 60° C. | T | 76 sec | 100 sec | 15 sec | 23 sec | 5 sec |
|  | NT | 2 sec | 2 sec | 2 sec | 2 sec | 2 sec |
| Soil release | T | 5 | 5 | 5 | 5 | 5 |
|  | NT | 1 | 1 | 1 | 1 | 1 |

Examination of the results in the above table shows that the fabric treated according to the invention is hydrophobic and oleophobic and that its wettability at 60° C. is good, which facilitates elimination of soiling substances.

EXAMPLE 5

A glass reactor of 500 cm³, fitted with a stirrer, a reflux condenser and a heater is charged with 48 g (0.089 mol) of polyfluorinated monomer of the formula:

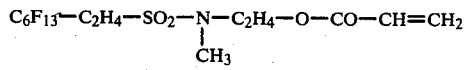

48 g (0.071 mol) of the thioglycolic ester of example 1 and 260 g of dioxane. The mixture is heated at 80° C., 4 g of tert.butyl hydroperoxide is added and the reaction allowed to proceed for 12 hours at 80° C. After cooling, 360 g of a solution ($S_5$) of a telomer according to the invention is obtained. This solution, which is auto-emulsifiable in water has a dry solids content of 26% and a fluorine content of 6%. The telomer is obtained in the form of a paste of low consistency with a liquifaction point of about 70° C.

A cotton fabric is fulled in an aqueous bath containing 180 g/l of the above solution ($S_5$), 80 g/l of an aqueous 65% solution of a precondensate of hexamethylol trimethyl ethermelamine and 24 g/l of magnesium chloride hexahydrate. After squeezing with an extraction rate of about 80%, the fabric is treated for 3 minutes at 165° C. in a thermal condenser. The characteristics of the cotton fabric treated in this way (T) are shown in the following table in comparison with those of an untreated cotton fabric (NT).

| Characteristics | Treatment | 0L | 3L | 6L | 9L | 12L |
|---|---|---|---|---|---|---|
| Oleophobic | T | 8 | 7 | 4 | 4 | 3 |
|  | NT | 0 | 0 | 0 | 0 | 0 |
| Spray test | T | 50 | 70 | 80 | 70 | 50 |
|  | NT | 0 | 0 | 0 | 0 | 0 |
| Soil release | T | 5 | 5 | 5 | 5 | 5 |
|  | NT | 2 | 2 | 2 | 2 | 2 |

Examination of the results in the above table show that the fabric treated according to the invention is oleophobic and hydrophobic, that stains are easily removed by washing and that these different properties are fairly well conserved, even after several washes.

EXAMPLE 6

A glass reactor of 2000 cm³, fitted with a stirrer, a condenser with separator and a heater is charged with 600 g (1 mol) of polyoxyethylene glycol of molecular weight 600, 230 g (2 mol) of 80% thioglycolic acid, 1 g of paratoluenesulphonic acid and 600 g of toluene. The mixture is heated to boiling and 82 g of water is removed by azeotropic entrainment. After removal of the toluene by distillation, 740 g of the diester of the above mentioned thioglycollic acid and polyoxyethylene glycol is obtained. The crystallization point of this liquid product which is soluble in water is 9° C.

Another glass reactor of 500 cm³, fitted with a stirrer, a reflux condenser and a heater is charged with 48 g of the polyfluorinated monomer of the formula

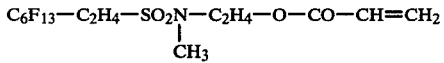

37 g of the above dithioglycolate and 170 g of dioxane. The mixture is heated to 80° C., 4 g of tert.butyl hydroperoxide is added and the reaction allowed to proceed for 12 hours at 80° C. After cooling, 259 g of a solution ($S_6$) of a telomer according to the invention, dispersible in water, is obtained. This solution contains 32% of dry matter and 8.3% of fluorine. The telomer is obtained in the form of a paste of low consistency with a liquifaction point of about 60° C.

Polyester fabric (PE) and polyacrylonitrile (PAC) fabric are fulled in an aqueous bath containing 80 g/l of the above solution ($S_6$), 40 g of a 65% aqueous solution of a precondensate of hexamethylol trimethyl ether-melamine and 12 g of magnesium chloride hexahydrate. After squeezing with an extraction rate of 90% for the polyester fabric and 110% for the polyacrylonitrile fabric, the fabrics are treated for 3 minutes at 165° C. in a thermal condenser.

The characteristics of the fabrics treated with the product of the invention are shown in the following table in comparison with those of untreated reference fabrics (NT).

| Characteristics | Fabric | Treatment | 0L | 3L | 6L | 3NS |
|---|---|---|---|---|---|---|
| Oleophobic | PE | T | 8 | 6 | 2 | 8 |
|  |  | NT | 0 | 0 | 0 | 0 |
|  | PAC | T | 8 | 6 | 2 | 8 |
|  |  | NT | 0 | 0 | 0 | 0 |
| Hydrophobic | PE | T | 8 | 8 | 8 | 8 |
|  |  | NT | 0 | 0 | 0 | 0 |

| Character-istics | Fabric | Treat-ment | 0L | 3L | 6L | 3NS |
|---|---|---|---|---|---|---|
| | PAC | T | 8 | 8 | 8 | 8 |
| | | NT | 0 | 0 | 0 | 0 |
| | PE | T | 5 | 5 | 5 | 5 |
| Soil release | | NT | 1 | 1 | 1 | 1 |
| | PAC | T | 5 | 4 | 4 | 5 |
| | | NT | 1 | 1 | 1 | 1 |
| | PE | T | 28 min | 13 min | 3 min | 6 min |
| Wettability | | NT | 2 sec | 2 sec | 2 sec | 2 sec |
| at 20° C. | PAC | T | >1 h | 17 min | 3 min | 21 min |
| | | NT | 2 sec | 2 sec | 2 sec | 2 sec |
| | PE | T | 60 sec | 6 sec | 4 sec | 5 sec |
| Wettability | | NT | 2 sec | 2 sec | 2 sec | 2 sec |
| at 60° C. | PAC | T | 110 sec | 8 sec | 4 sec | 5 sec |
| | | NT | 2 sec | 2 sec | 2 sec | 2 sec |

EXAMPLE 7

A glass reactor of 500 cm³, fitted with a stirrer, a reflux condenser and a heater is charged with 33 g (0.061 mol) of polyfluorinated monomer of the formula:

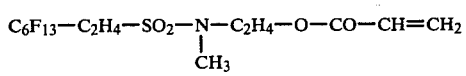

$$C_6F_{13}-C_2H_4-SO_2-N(CH_3)-C_2H_4-O-CO-CH=CH_2$$

34 g (0.050 mol) of the thioglycollic ester of example 1, 2 g (0.015 mol) of ethylene glycol monoacrylate and 200 g of acetone. The mixture is heated to 60° C. and 0.5 g of lauroyl peroxide and 0.1 g of tert.butyl perpivalate are added and allowed to react for 12 hours at 80° C. After cooling, 269 g of a solution (S₇) of a cotelomer according to the invention is obtained. This solution, which is completely miscible with water, has a dry solids content of 25% and a fluorine content of 5.6%. The cotelomer is obtained in the form of a paste of low consistency with a liquifaction point of 40° C.

| A composition is prepared containing: | |
|---|---|
| Solution (S₇) | 70 g |
| 71% solution of hexa-(butoxymethyl)-melamine in butanol | 25 g |
| phosphoric acid | 5 g |

This composition is applied to an iron plate in two layers by means of a brush. After drying the coated plate is subjected to a thermal treatment at 120° C. for one hour.

The treated plate and another, untreated, iron plate are placed for 48 hours in an atmosphere saturated with water at 90% relative humidity at 20° C. At the end of this time it is found that the treated plate is unchanged while the reference plate is completely rusted.

EXAMPLE 8

The solution (S₆) of which the preparation is described in example 6, is sprayed on "stoned calf-skin" leather. After drying for 2 hours at 60° C., an oleophobic and hydrophobic leather is obtained, of which the characteristics are shown in the following table compared with those of an identical but untreated leather.

| Characteristics | treated leather | untreated leather |
|---|---|---|
| Oleophobic (std. AATCC -test method 118) | 8 | 0 |
| Spray test (std. AATCC -test method 22) | 80 | 0 |
| Time for penetration of a drop of water | >1 hour | 5 min 30 sec |

To determine the ease of cleaning of the leather, a test similar to that described in AATCC Technical Manual, test method 130-1970 is used. For this purpose, 5 drops of Nujol are placed on the leather. Impregnation of the leather is forced by placing on the drops of Nujol a piece of tracing paper and a weight of 200 g. After 1 minute, the ease of cleaning by hand with hot water containing a detergent or with perchloroethylene is assessed.

| Ease of cleaning with | treated leather | untreated leather |
|---|---|---|
| Pad soaked in perchloroethylene | excellent | poor |
| pad soaked in an aqueous solution of 1.4% of sodium butylnaphthalene sulphonate at 60° C. | excellent | poor |

EXAMPLE 9

A sheet of white paper "Afnor VII", unsized, weighing 82 g/m² is impregnated in a bath for size-press containing 40 g/l of the solution (S₁) described in example 1, 26 g of an aqueous solution of a glyoxal-urea-formaldehyde condensate with 55% dry solids content and 5 g of lactic acid. After draining with a rate of extraction of 100%, the paper is dried for 15 minutes at 120° C.

The table below shows the characteristics of the paper treated in this way compared with that of untreated reference paper.

| Characteristic | treated paper | untreated paper |
|---|---|---|
| Oleophobic (Std. AATCC - test method 118) | 4 | 0 |
| Wettability of a square of paper of 2.5 cm sides in water at 60° C. | 2 sec | 2 sec |

The paper is oleophobic at ambient temperature and perfectly hydrophilic in hot water at 60° C. It is therefore very suitable for making infusion bags for ground coffee.

EXAMPLE 10

A piece of wall paper is impreganted in an aqueous bath for size-press containing 40 g/l of the solution (S₁) described in example 1, 40 g of an aqueous solution of dimethyl dihydroxy ethylene-urea at 36% solid content and 5 g of lactic acid. After draining with an extraction rate of 30% the paper is dried for 5 minutes at 120° C.

A paper is obtained in this way which is resistant to grease stains, but which because of its hydrophilic properties at 60° C. can be easily removed with hot soapy water. Its characteristics are as follows:

Oleophilic: (std. AATCC—test method 118): 6
Wettability of a square of side 2.5 cm in a 1.4% aqueous solution of sodium butylnaphthalene sulphonate
at 20° C. >1 h
at 60° C. 5 min

EXAMPLE 11

An unsized Afnor VII paper weighing 77 g/m² is impregnated in an aqueous bath for size-press containing per liter 45 g of solution (S₂) described in example 2 above 22.5 g of an anionic latex of 20% solid matter and pH 2.9 obtained by emulsion copolymerization of a mixture of butyl acrylate (64.3%), vinyl acetate (14.3%), methacrylic acid (20%) and N-methylol acrylamide (1.4%), the copolymer having a K value of 88 and a glass transition temperature of +9° C.

330 g of a 1% aqueous solution of dye C.I. 15 510 (C.I. Acid Orange 7)

2.5 g of 28% ammonia.

After draining with an extraction rate of about 100%, the paper is dried at 120° C. for 15 minutes. This gives, with a good color efficiency, a sized paper colored organe with good uniformity, oleophobic and entirely suitable for writing with aqueous inks.

The following table gives the characteristics of paper treated in tis way in comparison with untreated paper.

| Characteristic | treated paper | untreated paper |
|---|---|---|
| Oleophobic (std. AATCC test method 118) | 4 | 0 |
| Writing test: ATIP No. 2, 1960 pp. 84–91 | | |
| smudge | 5 | 0 |
| spreading through | 5 | 0 |

EXAMPLE 12

An iron mould 305×405×40 mm is coated internally with a composition containing 6 g of solution (S₃) and 94 g of acetone. The coating is carried out with a brush, in two coats with an intermediate drying at ambient temperature of 30 minutes.

A concrete prepared from Portland cement CPALC-325 (1 part) gravel of granulometry 5/25 (2 parts) and river sand of granulometry 0/2 (1 part) is poured into the coated mould. The concrete is allowed to set for 48 hours at ambient temperature. After this time a slab of concrete is obtained which releases perfectly from the mould. Moreover, the mould is not rusted.

Working under the same conditions with an untreated mould, release from the mould is difficult, part of the concrete remains adhering to the mould and the latter is rusted.

EXAMPLE 13

A cotton satin fabric weighing 300 g/m² is fulled in an aqueous bath containing per liter, 6 g of solution (S₅) in example 5, 60 g of the 50/50 mixture of latex of fluorinated copolymers according to example 2 of French Pat. No. 2,175,332 (28% dry matter) 40 g of an aqueous solution at 65% of a precondensate of hexamethylol trimethyl ether-melamine and 12.5 g of lactic acid. After squeezing with a rate of extraction of 42%, the fabric is treated at 165° C. for 3 minutes. The following table shows the characteristics of the treated fabric in comparison with those of the same fabric untreated.

| Characteristics | treated fabric | untreated fabric |
|---|---|---|
| Oleophobic (std. AATCC test method 118) | 4 | 0 |
| Schmerber coefficient (penetration of water under pressure (std NFG 07.057) | 330 mm | 0 |
| soil release | 5 | 0 |

In addition, in comparison with the untreated fabric, the treated fabric if it is stained by forced penetration of 5 drops of Nujol, is easily cleaned by hand, either with the aid of a pad soaked in perchloroethylene or a pad soaked in an aqueous solution of 1.4 g/l of sodium butylnaphthalene sulphonate.

EXAMPLE 14

A pigment bath is prepared of the following ingredients:

dispersion of a copolymer of vinyl chloride and ethyl acrylate with 46% dry extract (example 6 of French Pat. No. 1,263,236): 80 g/l aqueous dispersion containing 30% of phthalocyanine blue pigment: 50 g/l 65% aqueous solution of a precondensate of hexamethylol trimethyl ether-melamine: 30 g/l solution (S₂) of example 2: 80 g/l ammonium nitrate: 10 g/l A piece of calico weighing 300 g/m² is fulled in the bath. After squeezing with an extraction rate of about 65% the calico is subjected to a thermal treatment of 4 minutes at 160° C.

In this way one obtains a fabric for awnings colored blue with a good uniformity and a good color efficiency oleophobic and waterproof as shown by the following characteristics:

| | |
|---|---|
| oleophobic (std. AATCC test method 118) | 8 |
| Schmerber coefficient (penetration by water under pressure - std. NF G07.057) | 250 mm |

EXAMPLE 15

An oak plank is coated by brush with a composition containing 70 g of solution (S₇) described in example 7, 25 g of a 71% solution of hexabutoxymethyl melamine in butanol and 5 g of phosphoric acid. Two coats are applied and allowed to dry for 2 hours at 60° C.

Several drops of water are placed on the treated wood. It is found that these evaporate without leaving any mark, while under the same conditions on untreated wood the water penetrates and forms a stain.

Again, if several drops of heptane are deposited on the treated wood it is found that this evaporates without leaving a mark. Under the same conditions, on the same, untreated wood, the heptane penetrates instantly and stains the wood.

EXAMPLE 16

A polyamide fabric is fulled in an aqueous bath containing per liter 200 g of solution (S₄) described in example 4, 40 g of a 65% aqueous solution of a precondensate of hexamethylol trimethyl ether-melamine and 5 g of magnesium chloride hexahydrate. After squeezing with an extraction rate of 96%, the fabric is dried for 5 minutes at 60° C. then treated for 2 minutes at 160° C. by means of a thermal condenser (Benz).

The resistance under 500 V dc is measured of a strip of treated fabric (T) 10 cm long, 5 cm wide at 65° hygrometric and at 20° C. In comparison with an untreated fabric (NT) a diminution of resistance is found, which allows good discharge static charges. In addition, the treated fabric is hydrophobic and oleophobic and permits good removal of soiling substances, as is shown by the performance figures in the table below.

| Characteristic | Treatment | 0L | 1L | 3L |
|---|---|---|---|---|
| resistivity (ohms) | T | $2.9 \times 10^{11}$ | $5.5 \times 10^{12}$ | $4.2 \times 10^{12}$ |
|  | NT | $30 \times 10^{14}$ | $30 \times 10^{14}$ | $30 \times 10^{14}$ |
| hydrophobic | T | 8 | 8 | 8 |
|  | NT | 0 | 0 | 0 |
| oleophobic | T | 8 | 8 | 8 |
|  | NT | 0 | 0 | 0 |
| soil release | T | 5 | 5 | 5 |
|  | NT | 2 | 2 | 2 |

EXAMPLE 17

A woollen fabric is fulled in a bath containing per liter 80 g of solution ($S_6$) described in example 6, 40 g of a 65% aqueous solution of a precondensate of hexamethylol trimethyl ether-melamine and 12 g of magnesium chloride hexahydrate. After squeezing with an extraction rate of 96%, the fabric is treated for 3 minutes at 130° C. in a thermal condenser.

Washings are then carried out in a machine of which the characteristics have already been described. Each washing is carried out with 30 liters of water and 60 g of detergent "Dash all temperatures" (i.e. 2 g/l) for 20 minutes at 30° C. in the presence of 2 kg of fabric, then follow 3 rinses with cold water at 37° THF. The fabrics so washed are dried and ironed before testing again. Dry cleaning is also carried out by immersion of the treated specimens in a bath of perchloroethylene at 20° C. for one hour. The fabrics are then spin dried, dried and ironed before being tested.

The characteristics of the woollen fabric so treated (T) with the product according to the invention are shown in the following table in comparison with a reference untreated fabric.

| Characteristics | Treatment | 0L | 3L | 6L | 9L | 3NS |
|---|---|---|---|---|---|---|
| olephoobic | T | 8 | 5 | 3 | 2 | 7 |
|  | NT | 0 | 0 | 0 | 0 | 0 |
| wettability at 20° C. | T | 40 min | 15 sec | 5 min | 4 min | 1 h |
|  | NT | 10 sec | 8 sec | 6 sec | 6 sec | 10 sec |
| wettability at 60° C. | T | 10 sec | 6 sec | 4 sec | 3 sec | 6 sec |
|  | NT | 3 sec | 3 sec | 3 sec | 3 sec | 3 sec |
| spray test | T | 100 | 100 | 100 | 100 | 100 |
|  | NT | 90 | 90 | 90 | 90 | 90 |
| soil release | T | 5 | 4 | 4 | 3 | 5 |
|  | NT | 1 | 1 | 1 | 1 | 1 |

EXAMPLE 18

The wettability of a polyester/cotton (66/33) fabric treated as described in example 1 (bath A) is determined by means of the following tests: Test A. Under the same conditions as those described in Test A AT CC 118-1972, one drop of a 5% solution of sodium lauryl sulphate with a surface tension of 34.5 dynes/cm at 25° C. is placed on the treated support and the time of penetration of this drop is noted. The measurements are carried out at 25° C. Test B. The same procedure is carried out as in test A, but using a 5% solution of a condensate of 1 mol of nonyl phenol and 10 mol of ethylene oxide of which the surface tension is 30.5 dynes/cm at 25° C. Test C. The same procedure is carried out as in test A, but using a 5% solution of cetyl trimethyl ammonium bromide, of which the surface tension is 31.5 dynes cm at 25° C.

The characteristics of the treated fabric (T) are shown in the following table in comparison with those of the untreated fabric.

| Tests | Fabric | 0L | 3L | 6L | 9L | 3NS |
|---|---|---|---|---|---|---|
| A | T | 47 min | 7 min | 8 min | 4 min | 15 min |
|  | NT | 1 sec | 1 sec | 1 sec | 1 sec | 1 sec |
| B | T | 24 min | 20 min | 4 min | 2 min | 10 min |
|  | NT | 1 sec | 1 sec | 1 sec | 1 sec | 1 sec |
| C | T | 24 min | 3 min | 1 min | 45 sec | 2 min |
|  | NT | 1 sec | 1 sec | 1 sec | 1 sec | 1 sec |

The stain resistance in relation to products currently in use is determined by placing at 20° C. on the same fabric (T) a small quantity of each of the substances listed in the following table. After 30 seconds it is wiped off with an absorbent material and the presence or absence of a stain is noted.

In comparison with an untreated fabric (NT) the results found are as follows:

| Substance used for the test | Surface tension dynes/cm at 20° C. | Fabric | 0L | 3L | 6L | 9L | 3NS |
|---|---|---|---|---|---|---|---|
| red wine 11° | 52.5 | T | − | − | − | − | − |
|  |  | NT | + | + | + | + | + |
| pomegranate syrup | 59 | T | − | − | − | − | − |
|  |  | NT | + | + | + | + | + |
| motor oil | 35 | T | − | − | − | − | − |
|  |  | NT | + | + | + | + | + |
| wine vinegar | 59 | T | − | − | − | − | − |
|  |  | NT | + | + | + | + | + |
| coffee | 50 | T | − | − | − | − | − |
|  |  | NT | + | + | + | + | + |
| Viandox (concentrated meat juice) | 50 | T | − | − | − | − | − |
|  |  | NT | + | + | + | + | + |
| salad oil based on sunflower oil | 37 | T | − | − | − | − | − |
|  |  | NT | + | + | + | + | + |
| liquid wax polish | 28 | T | − | − | − | +/− | − |
|  |  | NT | + | + | + | + | + |
| used engine oil | 36 | T | − | − | − | − | − |
|  |  | NT | + | + | + | + | + |
| blueberry jam | 51 | T | − | − | − | − | − |
|  |  | NT | + | + | + | + | + |
| Mayonnaise | 38 | T | − | − | − | − | − |
|  |  | NT | + | + | + | + | + |
| pig blood | 50.8 | T | − | − | − | − | − |
|  |  | NT | + | + | + | + | + |

In the above chart the symbols (+) indicates that the fabric was stained. The symbol (−) indicates that the fabric was not stained.

We claim:

1. A fluorinated telomerization product consisting of the reaction product of:
   (a) one mole of an ester of one or more polyols with one or more acids of the general formula:

$$HS-A(COOH)_n \qquad (I)$$

wherein A represents an aliphatic or cyclic hydrocarbon radical and n is a whole number from 1 to 4, and
   (b) 1 to 5 moles of one or more compounds possessing at least one ethylene bond, at least one of these compounds corresponding to the general formula:

$$Rf-B-\underset{R}{\underset{|}{C}}=CH-R \qquad (II)$$

wherein Rf represents a perfluorinated chain, straight or branched, containing 1 to 20 carbon atoms,
  one of the symbols R is hydrogen and the other is hydrogen or alkyl containing 1 to 4 carbon atoms; and
  Rf—B—is a residue selected from the group consisting of the residues of following formulae:

$$Rf-(CH_2)_x-SO_2-\underset{R'}{\underset{|}{N}}-(CXX')_y-\underset{R'''}{\underset{|}{C}}-O-\overset{O}{\overset{\|}{C}}-$$

$$Rf-O-\overset{O}{\overset{\|}{C}}-$$

$$Rf-(CXX')_x-O-\overset{O}{\overset{\|}{C}}-$$

$$Rf-(CXX')_x-(OC_2H_2XX')_z-O-\overset{O}{\overset{\|}{C}}-$$

$$Rf-(CXX')_x-O-(CXX')_y-O-\overset{O}{\overset{\|}{C}}-$$

$$Rf-(CXX')_x-S-(CXX')_y-O-\overset{O}{\overset{\|}{C}}-$$

$$Rf-(CXX')_x-S-\overset{O}{\overset{\|}{C}}-$$

$$Rf-(CXX')_x-SO_2-(CXX')_y-O-\overset{O}{\overset{\|}{C}}-$$

$$Rf-SO_2-(CXX')_x-O-\overset{O}{\overset{\|}{C}}-$$

$$Rf-CH=CH-CH_2-(OC_2H_2XX')_z-O-\overset{O}{\overset{\|}{C}}-$$

$$Rf-CH=CH-(CXX')_x-O-\overset{O}{\overset{\|}{C}}-$$

$$Rf-CF=CH-CH=CH-(OC_2H_2XX')_z-O-\overset{O}{\overset{\|}{C}}-$$

$$Rf-SO_2-\underset{R'}{\underset{|}{N}}-(CXX')_x-O-\overset{O}{\overset{\|}{C}}-$$

$$Rf-SO_2-\underset{R'}{\underset{|}{N}}-(CXX')_x-\underset{R'''}{\underset{|}{C}}-O-\overset{O}{\overset{\|}{C}}-$$

$$Rf-CO_2-(CXX')_x-O-\overset{O}{\overset{\|}{C}}-$$

$$Rf-CO-(CXX')_x-O-\overset{O}{\overset{\|}{C}}-$$

$$Rf-CO-\underset{R'}{\underset{|}{N}}-(CXX')_x-O-\overset{O}{\overset{\|}{C}}-$$

$$Rf-SO_2-(CXX')_x-$$
$$Rf-O-$$
$$Rf-CO_2-(CXX')_x-$$
$$Rf-(CH_2)_x-\underset{R'}{\underset{|}{N}}-CO-$$
$$Rf-SO_2-\underset{R'}{\underset{|}{N}}-CO-$$
$$Rf-CO-\underset{R'}{\underset{|}{N}}-CO-$$

-continued $$Rf-CO-\underset{R'}{\underset{|}{N}}-(CXX')_x-\underset{R''}{\underset{|}{N}}-CO- \text{ and}$$

$$Rf-CO-\underset{R'}{\underset{|}{N}}-$$

wherein
  x is a whole number between 1 and 20;
  y is a whole number from 1 to 4;
  z is a whole number from 1 to 10;
  R' is hydrogen, alkyl with 1 to 10 carbon atoms, cycloalkyl with 5 to 12 carbon atoms or hydroxyalkyl with 2 to 4 carbon atoms;
  R'', R''', X and X' are the same or different and each represents hydrogen or alkyl with 1 to 4 carbon atoms.

2. A fluorinated product according to claim 1 in which the acid of formula (I) is thioglycollic acid.

3. A fluorinated product according to claim 2 obtained by starting from a monoester of thioglycollic acid with a polyol.

4. A fluorinated product according to claim 2 obtained by starting with a diester of thioglycollic acid with a polyol.

5. A fluorinated product according to claim 1 in which the polyol is a poly(oxyalkylene) glycol.

6. A fluorinated product according to claim 1 in which the polyol is a condensate of the alkylene oxide with a polyol, an amine or an aminoalcohol.

7. A fluorinated product according to claim 1 in which Rf contains 2 to 10 carbon atoms.

8. A fluorinated product according to claim 1 in which x is 2 or 4 and y is 1 or 2.

9. A fluorinated product according to claim 1 in which both R are hydrogen atoms.

10. A fluorinated telomerization product consisting of the reaction product of:
  (a) one mole of an ester of thioglycolic acid with one or more polyols, and
  (b) 1 to 5 moles of one or more compounds of the formula:

$$Rf-(CH_2)_x-SO_2-\underset{R'}{\underset{|}{N}}-(CXX')_y-\underset{R'''}{\underset{|}{C}}-O-\overset{O}{\overset{\|}{C}}-\underset{R}{\underset{|}{C}}=CH-R$$

wherein Rf represents a perfluorinated chain, straight or branched, containing 1 to 20 carbon atoms;
  one of the symbols R is hydrogen and the other is hydrogen or alkyl containing 1 to 4 carbon atoms;
  x is a whole number between 1 and 20;
  y is a whole number from 1 to 4;
  R' is hydrogen, alkyl with 1 to 20 carbon atoms, cycloalkyl with 5 to 12 carbon atoms or hydroxyalkyl with 2 to 4 carbon atoms; and
  R'', R''', X and X' are the same or different and each represents hydrogen or alkyl with 1 to 4 carbon atoms.

11. A composition for treating a surface to render said surface stain resistant comprising an effective amount of a fluorinated product as defined in claim 1 in a liquid medium.

12. A composition for treating a textile to render said textile resistant to soiling comprising an effective amount of a fluorinated product as defined in claim 1 in a solvent medium.

13. A composition for treating a surface to render the surface oil and water repellant comprising a fluorinated product as defined in claim 1 in an inert vehicle therefore.

14. A process for the preparation of fluorinated telomerization product comprising reacting one mole of an ester of one or more polyols with one or more acids of the general formula $$HS-A(COOH)_n$$

where A represents an aliphatic or cyclic hydrocarbon radical which may contain atoms of oxygen, nitrogen, sulphur or halogen and n is a whole number from 1 to 4, and 1 to 5 moles of one or more compounds possessing at least one ethylene bond, at least one of these compounds corresponding to the general formula $$Rf-B-\underset{\underset{R}{|}}{C}=CH-R$$

where Rf represents a perfluorinated chain, straight or branched, containing 1 to 20 carbon atoms, B is a bivalent chain, one of the symbols R is a hydrogen atom and the other is a hydrogen atom or an alkyl group containing 1 to 4 carbon atoms.

15. The process of claim 14 wherein the reaction is carried out in the presence of a catalyst.

16. A process according to claim 14 wherein the reaction is carried out in the presence of 0.01 to 5% of catalyst in relation to the weight of the ethylenic compound used.

17. A process according to claim 14 wherein the reaction is carried out at a pH between 2 and 11 inclusive and at a temperature between 40 and 120° C.

18. A method for the treatment of fabrics to render said fabric oil repellant and water repellant comprising applying to said fabrics a continuous coating of a fluorinated compound as defined in claim 1.

19. A method for the treatment of paper to render said paper oil repellant and water repellant comprising applying to said paper a continuous coating of a fluorinated compound as defined in claim 1.

20. A method for the treatment of wood to render said wood oil repellant and water repellant comprising applying to said wood a continuous coating of a fluorinated compound as defined in claim 1.

21. A method for the treatment of leather to render said leather oil repellant and water repellant comprising applying to said leather a continuous coating of a fluorinated compound as defined in claim 1.

22. A method for the treatment of metal to render said metal oil repellant and water repellant comprising applying to said metal a continuous coating of a fluorinated compound as defined claim 1.

23. A method for the treatment of masonry to render said masonry oil repellant and water repellant comprising applying to said masonry a continuous coating of a fluorinated compound as defined in claim 1.

24. A method for the treatment of glass to render said glass oil repellant and water repellant comprising applying to said glass a continuous coating of a fluorinated compound as defined in claim 1.

25. A method for the treatment of porcelain to render said porcelain oil repellant and water repellant comprising applying to said porcelain a continuous coating of a fluorinated compound as defined in claim 1.

26. A method for the treatment of plastic to render said plastic oil repellant and water repellant comprising applying to said plastic a continuous coating of a fluorinated compound as defined in claim 1.

27. A method for the treatment of painted surface to render said painted surface oil repellant and water repellant comprising applying to said painted surface a continuous coating of a fluorinated compound as defined in claim 1.

28. A method for the treatment of cardboard to render said cardboard oil repellant and water repellant comprising applying to said cardboard a continuous coating of a fluorinated compound as defined in claim 1.

29. The process of claim 14 wherein Rf contains 2 to 10 carbon atoms.

30. The process of claim 16 wherein the amount of catalyst is 0.1 to 1.5% in relation to the weight of the ethylenic compound used.

31. The process of claim 17 wherein the reaction temperature is between 50° and 90° C.

32. A surface having applied thereto a coating of a fluorinated compound as defined in claim 1.

* * * * *